Figure 1:
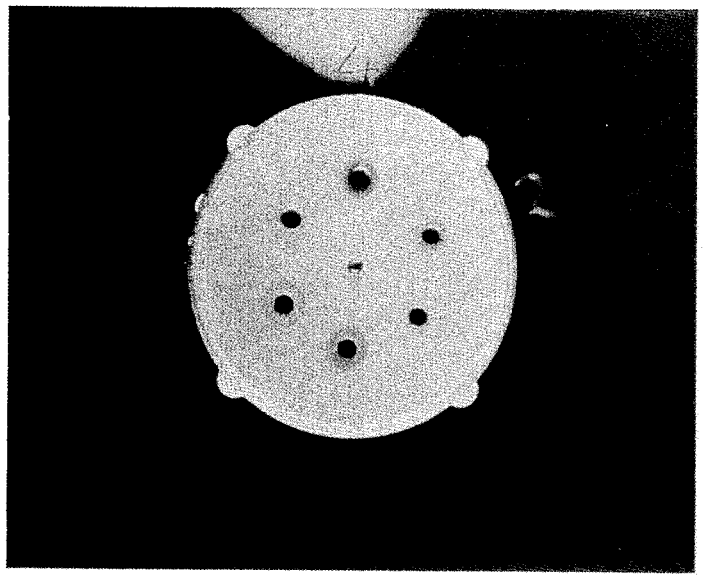

United States Patent [19]

Goldberg

[11] 3,917,515

[45] Nov. 4, 1975

[54] SERUM LIPASE METHOD AND MEDIUM

[76] Inventor: Jack M. Goldberg, 7335 N. Lavergne, Skokie, Ill. 60076

[22] Filed: Mar. 13, 1974

[21] Appl. No.: 450,830

[52] U.S. Cl............. 195/103.5 R; 195/99; 195/101
[51] Int. Cl.² ...................... C12K 1/04 C12K/1/10;
[58] Field of Search ........................ 195/103.5 R, 195/62, 99, 100, 101, 102

[56] References Cited
UNITED STATES PATENTS

| | | | |
|---|---|---|---|
| 3,689,364 | 9/1972 | Härtel et al. | 195/99 |
| 3,778,352 | 11/1973 | Bishop et al. | 195/99 |

*Primary Examiner*—A. Louis Monacell
*Assistant Examiner*—C. A. Fan
*Attorney, Agent, or Firm*—Wallenstein, Spangenberg, Hattis & Strampel

[57] ABSTRACT

Method and medium for the measurement of pancreatic lipase activity in serum. The method involves contacting a serum lipase containing fluid with a medium which enables differential diffusion of the lipase and other constituents in the fluid to take place to provide diagnostically meaningful indicia of lipase activity in the medium. The medium comprises a substrate containing a substance capable of being acted upon by pancreatic lipase, and an agent for inhibiting or impeding the activity of competing enzymes in serum. The substrate has a pH in a range which favors pancreatic lipase activity, and is supported in a normally nonfluid, inert material which favors differential diffusion of the pancreatic lipase. An antiseptic, which may be a bactericide or microbicide, advantageously is incorporated into the substrate to prevent bacterial growth during incubation of the medium in testing for lipase activity, and storage.

30 Claims, 4 Drawing Figures

SERUM LIPASE METHOD AND MEDIUM

The present invention relates to a method, and to a medium for use in carrying out the method, which are highly specific for the determination of pancreatic lipase activity in serum.

Heretofore, the diagnosis of diseases of the pancreas has been both difficult and, more often than not, uncertain. In fact, in many instances, a diagnosis of a pancreatic disease has to be made by inference and the exclusion of other diseases. In certain cases, a definitive diagnosis can only be made by surgical exploration. Prior attempts to develop a meaningful preoperative diagnostic test for pancreatic diseases have involved serum amylase. The measurement of serum amylase can be carried out using either a liquid or solid medium. While serum amylase concentrations above normal levels can be an indication of a possible pancreatic problem the test, in many instances, is inconclusive since serum amylase levels may rise due to nonpancreas related diseases such as inflammation of the parotid glands, or renal insufficiency. Further in this same connection, particularly in the case of acute pancreatitis if the serum amylase is determined before the disease has reached its peak, or if the patient is seen late, the levels of serum amylase obtained may be nondiagnostic. Serum lipase determinations also have heretofore been employed as a means for diagnosing pancreatic diseases. These determinations are generally made in liquid media, and utilize either titrimetric or turbidimetric techniques to measure serum lipase activity. The first mentioned technique, which involves continuous titration to determine potentiometric changes in the serum lipase containing liquid medium, requires elaborate and expensive equipment. The turbidimetric method, as the term implies, measures differences in turbidity in the liquid medium containing the serum lipase. This method generally is carried out at substrate concentrations far below the Km for serum lipase, and the ultimate determination of lipase activity is based in large measure upon a subjective estimation by an operator arrived at by spectrophotometric examination of light transmission changes in the liquid medium. Over and above the foregoing considerations, the titrimetric and turbidimetric methods of making serum lipase determinations share a common defect which casts doubt on their reliability as specific tests for serum lipase activity. This defect, which was unexpectedly revealed in the course of the evolution of the present invention, concerns the discovery of the presence of a lipase inhibitor in normal serum. The inhibitor, the exact nature of which is, as yet, undetermined, is believed to be a factor which is significantly responsible for the inconsistent, and not infrequently, inconclusive results obtained with these methods.

In accordance with one aspect of the present invention, a method has been evolved which comprises a highly specific test for lipase of pancreatic origin. The method, while enabling consistently uniform and accurate serum lipase determinations to be made irrespective of the presence of lipase inhibiting or competing agents, is easy to carry out, provides readily assayable indicia or serum lipase activity, and requires no specialized instrumentation. In accordance with another aspect of the invention, a medium for practicing the method is provided which acts as a vehicle for carrying out the method of the invention. The medium can be formulated from readily available materials utilizing standard equipment. It is preferably essentially nonfluid in character, and can be packaged in ready-to-use form in convenient, easily manipulated, inexpensive containers which can be discarded after use.

The present invention is centered on the discovery that serum lipase has a coefficient of diffusion which is different from that of lipase inhibiting or competing agents. The method of the invention comprises contacting a serum or fluid containing pancreatic lipase with a medium which enables diffusion of the lipase to take place therein at a rate which is different from the rate in which lipase inhibiting or competing agents present in the fluid will diffuse in the medium. The medium comprises a substance capable of being acted upon by the diffused lipase whereby diagnostically meaningful indicia of lipase activity will be provided in the medium. The medium, in its preferred form, comprises a substantially inert matrix which functions as a support or carrier for a substrate containing, as essential ingredients, a substance capable of lipolytic attack by lipase, and an agent which acts to inhibit or impede the activity of lipase competing materials present in the serum lipase containing fluid. The pH of the medium is maintained in a range which favors lipolysis. A microbicide or bactericide desirably is incorporated into the medium to prevent bacterial growth in the medium both during storage and while carrying out lipase activity determinations with the medium. The medium may be packaged in any size or shaped container desired. However, from the standpoint of convenience both in use and storage, the medium advantageously is placed in small, shallow, round containers or plates of the Petri dish type.

The substance in the substrate of the medium upon which the lipase acts advantageously is an ester, or a mixture of esters, of a polyhydric alcohol wherein the acyl group, or groups, contains from 11 to about 32, preferably from 12 to 22, carbon atoms. Especially preferred are the triesters of such alcohols exemplified by fatty acid triglycerides wherein the fatty acid groups each comprise from 11 to 22 carbon atoms. The triglycerides may be utilized in pure form, or as mixtures thereof such as are present in various vegetal and animal materials. In utilizing a natural material as the source of the triglycerides, the $C_{11}$ and higher, and the $C_{18}$, in particular, triglycerides present in the material should comprise upwards of 80 percent, especially desirably from about 85 percent to about 95 percent, of the mixture. Specific examples of pure triglycerides useful for the purposes of the invention are triolein, tripalmitin, trilinolein, trilinolenin, tripentadescanonin, and the like. Exemplary of natural sources of triglycerides which can be used are olive oil, peanut oil, sunflower seed oil, coconut oil, and the like. Of the foregoing, olive oil, especially commercially available refined olive oil, is preferred.

The agents employed to inhibit or impede, among other things, the activity of competing materials such as, for example, lipoprotein lipase or esterase, present in the serum, preferably are the alkali metal, especially sodium salts of bile acids. Exemplary of such salts are sodium cholate, sodium glycocholate, sodium deoxycholate, sodium taurocholate, and the like. Apart from its function as an inhibitor of competing materials such as enzymes present in serum, the bile salt also acts to stabilize the pancreatic lipase, and, importantly, serves as an emulsion stabilizer in those instances where a natural source of triglycerides such as olive oil is employed as a component of the substrate. In addition to the foregoing functions, the bile salt also is believed to inhibit bacterial growth in the medium.

The pH of the medium is important in promoting lipolysis by the serum lipase. In accordance with the present invention, the action of the lipase has been found to be specific in a pH range or from about 8 to 10, with optimum activity occurring at pH in the range of from about 8.5 to about 9.5. Therefore, in order to maintain the medium in the lipase activity pH range indicated, a buffer advantageously is incorporated into the substrate of the medium. Any of various buffers, both inorganic and organic, can be utilized for this purpose. Specific examples of buffers which can be used are tris (hydroxmethyl) aminomethane/hydrochloric acid; disodium phosphate/citric acid; sodium hydroxide/boric acid; and numerous others.

As stated, a microbicidal or bactericidal agent desirably is added to the substrate of the medium to inhibit bacterial growth. Exemplary of such agents are sodium azide, merthiolate, mercuric salicylate, various antibiotics including chlortetracycline and oxytetracycline and the like. The agents selected should be of a character such as not to inhibit the lipase activity.

The substantially inert carrier or support material for the substrate of the medium advantageously has a molecular porosity such that differential diffusion of the serum lipase and the other components present in the serum can occur. The carrier or support material should also be capable of eliciting, visually or otherwise, indicia of lipase activity after diffusion of the lipase has occurred. The foregoing desiderata can be met by materials obtained from natural sources or synthetic materials. Exemplary of materials of natural origin which can be used are agar, agarose, starch and the like. Specific examples of synthetic materials which can be used are plastics exemplified by polyacrylamide, polymethacrylamide, polyethacrylamide and the like.

The proportions of the ingredients comprising the substrate of the medium are somewhat variable. The generally optimum objectives of the invention are achieved, however, with from about 0.01 to about 1 percent, especially desirably from about 0.03 to about 0.5 percent by weight of the medium, of a substance such as a triglyceride upon which the serum lipase can act, and from about 0.05 to about 1 percent, usually from about 0.1 to about 0.5 percent, by weight of the medium, of an agent for inhibiting or impeding lipase competing materials in the serum. The amount of microbicide or bactericide incorporated into the medium can range from about 0.05 to about 1 percent preferably from about 0.1 to about 0.5 percent, by weight of the medium. The quantity of buffer used will, of course, depend upon the nature of the buffer. on a volume basis, the buffer can comprise from about 15 millimols to about 1 mole, usually from about 25 millimols to about 100 millimols, per liter of medium.

In formulating the medium, the conditions under which the ingredients are mixed should be such that the final mixture remains stable after it is placed in a suitable container for use. Thus, for example, in utilizing olive oil as the source of triglycerides upon which the serum lipase will act, the olive oil, together with the the other ingredients, comprising the medium, are mixed in a manner to form a stable emulsion of the olive oil. The temperatures, for instance, at which mixing is carried out should not be at a level at which mixture will become too viscous and cause entrapment of air bubbles, or will cause the emulsion to break. The final mixture, furthermore, should be maintained at a temperature whereby it will remain in a molten, easily pourable state. As indicated, containers of the Petri dish type advantageously are utilized in accordance with the preferred practice of this invention to hold the medium and to carry out the method.

The following examples are illustrative of the invention but they are not to be construed as in any way limitative since various modifications can be made in the light of the guiding principles and teachings disclosed herein.

EXAMPLE I 4 ml of a 1 percent solution of olive oil in ethanol are mixed with 50 ml of a 0.1 molar tris (hydroxymethyl) aminoethane/hydrochloric acid buffer containing 200 mg of sodium deoxycholate and 100 mg of sodium azide. The resulting mixture is stirred into 50 ml of water in which 1 gr of agarose has been dissolved, while maintaining the agarose solution at a temperature of 50°C. The final mixture is then poured into Petri dishes and allowed to cool and set. The containers are then covered with an air tight lid.

EXAMPLE II

The procedure outlined in Example I is followed, except that triolein is used as the source of triglycerides, and sodium taurocholate is used in place of sodium deoxycholate.

EXAMPLE III

Utilizing plates as prepared in accordance with Example I, seven evenly spaced wells 4 mm in diameter are formed in the medium in the plates. Some of the wells are filled with 10 microliters of a standard serum while others are filled with a like amount of patient's serum. The plates are sealed, and incubated for 2 hours by floating the sealed plates in a water bath maintained at 30°C. After diffusion of the lipase has taken place, lipase activity is observed by the presence of a circular zone of clearing in the substrate spaced from the well. It may also exhibit a zone of no clearing surrounded by a zone of clearing in a "bulls-eye" pattern. Quantitation of lipase activity is performed by plotting the activity of standard sera on a 2 cycle log scale versus the diameter of the circular zone of lipase activity observed for the standards on a linear scale. patient values are read directly off the standard curve.

Referring now to the drawings, the characteristic "bulls-eye" pattern obtained in accordance with the practice of the invention is dramatically illustrated. In FIG. 1, the serial daily lipase determinations on a case of pancreatitis due to gallstones in the common duct are shown. The numerals 4, 2 and 1 represent wells in the medium containing serial dilutions of Monitrol II, 4, 2 and 1 Cherry-Crandall units, respectively. The wells labeled Day 1, Day 2 and Day 4 contain serum samples obtained from the patient on the first, second and fourth days. It is noteworthy that on Day 1, during the acute phase of the disease, the patient's serum cleared the medium from the adjacent periphery of the well. On Day 2, however, there was a zone of inhibition around the well, and clearing of the medium occurred outside the zone of inhibition in the "bulls-eye" pattern. Day 4 showed no lipase activity.

Figure 2:
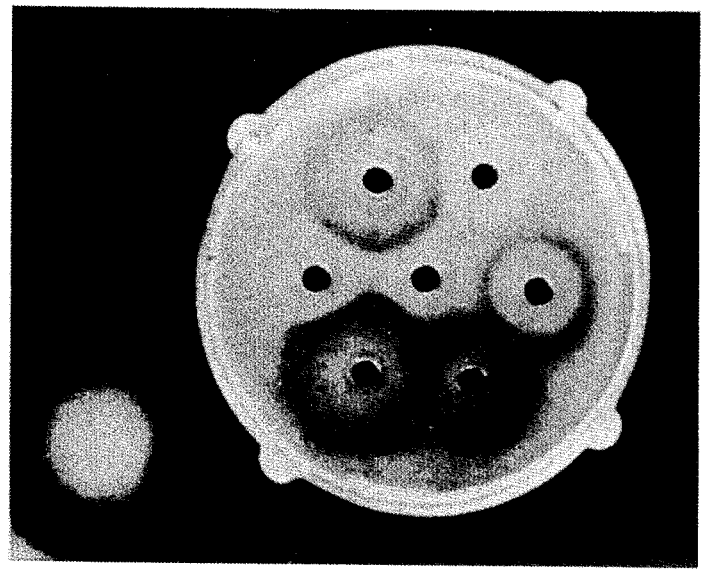

In FIG. 2 of the drawing, the presence of an inhibitor of lipase activity in normal sera is manifested. As shown, three of the wells formed in the medium contain normal serum, while three others contain serum from patients with clinical systems of acute pancreatitis. The seventh well contained a standard. The plate was allowed to incubate at 30°C for 24 hours. The three wells containing the patient's sera cleared the medium in ever-increasing circles, but would never clear into the wells containing the normal serum.

Figure 3:
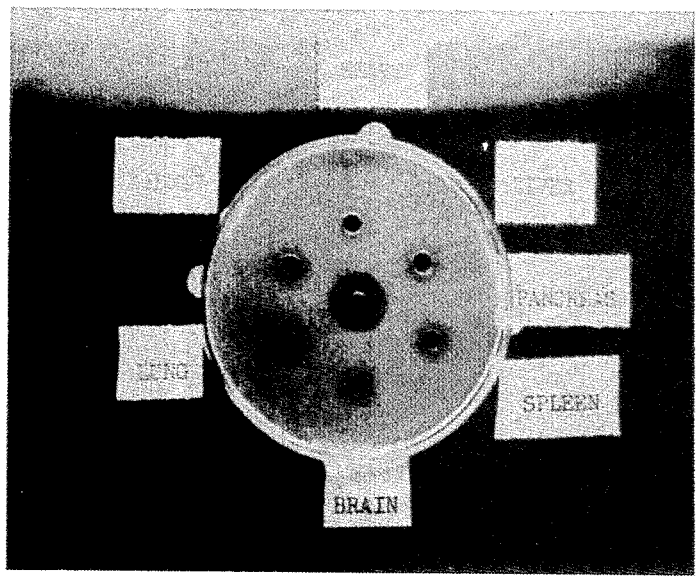
Figure 4:
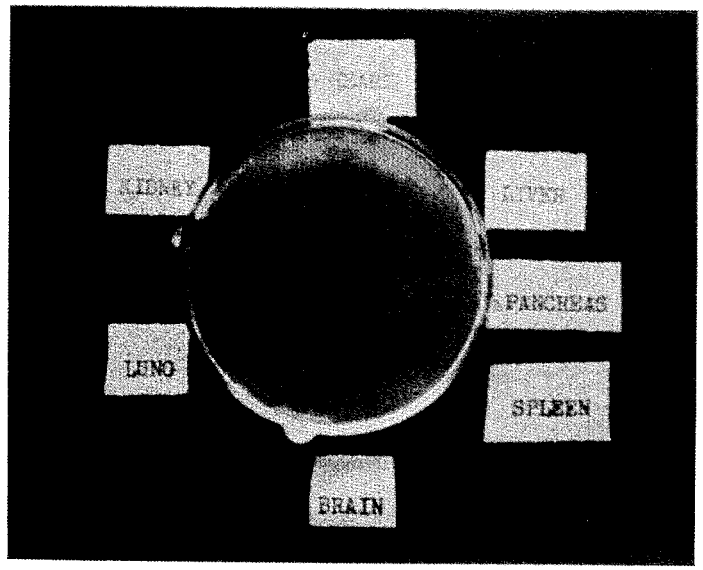

In order to demonstrate the specificity of the medium of the invention for lipase activity of pancreatic origin, extracts of several organs were prepared by homogenizing tissues obtained at autopsy into normal pool serum. The results are shown in FIGS. 3 and 4 of the drawing. FIG. 3 is a view of the plate after incubation for 2 hours at 30°C. It may be pointed that, in FIG. 3, the zones around peripheral wells are due to the yellow pigment in the serum and not true clearing of the substrate. FIG. 4 shows the same plate after incubation for 24 hours at 30°C. The high specificity for the pancreatic lipase (FIG. 3), and the inhibitory effect of normal serum (FIG. 4) are shown by the sharp zones of inhibition around the negative or normal serum containing wells.

What is claimed is:

1. A method of measuring pancreatic lipase activity in serum comprising: providing a medium comprising a substantially inert, supporting matrix having a porosity which enables pancreatic lipase to diffuse therein at a rate which is different from the rate at which lipase competing agents in serum will diffuse therein said medium containing a substance capable of being acted upon by the pancreatic lipase and a substance which acts to inhibit the activity of pancreatic lipase competing agents present in serum, introducing into the medium serum containing pancreatic lipase, and allowing the pancreatic lipase and any pancreatic lipase competing agents present in the serum to differentially diffuse in the medium and the pancreatic lipase to act upon said first mentioned substance to provide in the medium measurable indicia of pancreatic lipase activity.

2. A method according to claim 1 wherein the medium enables the pancreatic lipase to diffuse at a rate which is greater than the rate at which lipase competing agents in serum will diffuse.

3. A method according to claim 1 wherein the medium is incubated at a temperature of about 30°C during diffusion.

4. A method according to claim 1 wherein a depression is formed in the medium for receiving the pancreatic lipase containing serum and diffusion of the lipase takes place outwardly and radially from the depression, the action of the lipase upon said substance taking place in a circular pattern visible in the medium which pattern provides a measure of pancreatic lipase activity in the serum.

5. A method according to claim 1 wherein the matrix is formed of a member of the group consisting of agar, agarose and polyacrylamide, and the substance upon which the lipase can act is a triester of a polyhydric alcohol wherein the acyl groups contain from 11 to 32 carbon atoms.

6. A medium for use in the measurement of pancreatic lipase activity in serum comprising a substrate containing a substance capable of being acted upon by pancreatic lipase and an agent for impeding the activity of pancreatic lipase competing agents present in serum, said substrate being supported in a substantially inert matrix having a porosity which enables pancreatic lipase to diffuse therein at a rate which is different from the rate at which lipase competing agents present in serum will diffuse therein.

7. A medium according to claim 6 wherein the substance upon which the lipase can act is a triglyceride.

8. A medium according to claim 7 wherein the triglyceride is a triglyceride of a higher molecular weight fatty acid.

9. A medium according to claim 8 wherein the fatty acid contains from 11 to 32 carbon atoms.

10. A medium according to claim 6 wherein the substance upon which the lipase can act is olive oil.

11. A medium according to claim 6 wherein the agent for impeding the activity of lipase competing agents present in serum comprises a bile salt.

12. A medium according to claim 11 wherein the bile salt is sodium deoxycholate or sodium taurocholate.

13. A medium according to claim 6 wherein the substrate is maintained at a pH in a range which favors pancreatic lipase activity.

14. A medium according to claim 13 wherein the pH of the substrate is in the range of about 8 to about 10.

15. A medium according to claim 6 wherein a buffer is incorporated into the medium to maintain the pH of the medium in a range which favors pancreatic lipase activity.

16. A medium according to claim 15 wherein the buffer is tris (hydroxymethyl) aminomethane/hydrochloric acid.

17. A medium according to claim 6 wherein a microbicide is incorporated therein to inhibit bacterial growth.

18. A medium according to claim 17 wherein the microbicide is sodium azide.

19. A medium for use in the measurement of pancreatic lipase activity in serum comprising a substrate containing olive oil, a bile salt, a microbicide, and a buffer for maintaining the pH of the substrate in the range of from about 8 to about 10, said substrate being supported in a substantially inert matrix having a porosity which enables tha pancreatic lipase to diffuse therein at a rate which is different from the rate at which lipase competing agents present in serum will diffuse therein.

20. A medium according to claim 19 wherein the substantially inert matrix is agar or agarose.

21. A method of preparing a medium for the measurement of pancreatic lipase activity in serum comprising: providing a substrate containing as essential ingredients a substance capable of being acted upon by pancreatic lipase and an agent for impeding the activity of pancreatic lipase competing agents present in serum, forming an intimate mixture of the substrate and a matrix forming material for supporting the substrate, said material being characterized in that it is substantially inert and provides a matrix having a porosity which enables the lipase to diffuse therein at a rate which is different from the rate at which lipase competing agents present in serum will diffuse therein, whereby the lipase will be able to act upon said substance to provide measurable indicia of pancreatic lipase activity in the medium.

22. A method according to claim 21 wherein the substrate is formed into a stable emulsion and is admixed with the matrix forming material in a manner to maintain it in an emulsified condition.

23. A method according to claim 21 wherein the substance which is capable of being acted upon by pancreatic lipase is a mixture of fatty acid triglycerides, and the agent for impeding the activity of pancreatic lipase competing agents present in serum is a bile salt.

24. A method according to claim 21 wherein the substance capable of being acted upon by pancreatic lipase is olive oil which is formed into a stable emulsion.

25. A method according to claim 21 wherein the substrate is formed into a stable emulsion containing olive oil, a bile salt, a microbicide and a buffer, said emulsion being admixed with a matrix forming material comprising a member selected from the group consisting of agar and agarose in a manner to maintain it in an emulsified condition in the matrix forming material.

26. An article for use in making determinations of pancreatic lipase activity in serum comprising a body portion having a layer of a medium therein for receiving serum containing pancreatic lipase, said medium comprising a substantially inert, supporting matrix having a porosity which enables the lipase in serum to diffuse therein at a rate which is different from the rate at which lipase competing agents present in serum will diffuse therein and containing a substance capable of being acted upon by the lipase.

27. An article according to claim 26 wherein the body portion comprises a shallow, open-faced container, and the medium is essentially solid.

28. An article according to claim 26 wherein the medium comprises a substrate which is supported in the matrix, the substrate being in the form of an emulsion which is stabilized in the matrix, the medium being maintained at a pH which favors pancreatic lipase activity.

29. An article according to claim 28 wherein the substrate comprises a mixture of fatty acid triglycerides, a bile salt, a microbicide and a buffer.

30. An article according to claim 26 wherein the substance capable of being acted upon by the lipase comprises a stabilized emulsion of olive oil.

* * * * *